Jan. 5, 1932.    J. N. JACOBSEN    1,840,100
PROCESSING APPARATUS
Filed Jan. 24, 1929    4 Sheets-Sheet 3

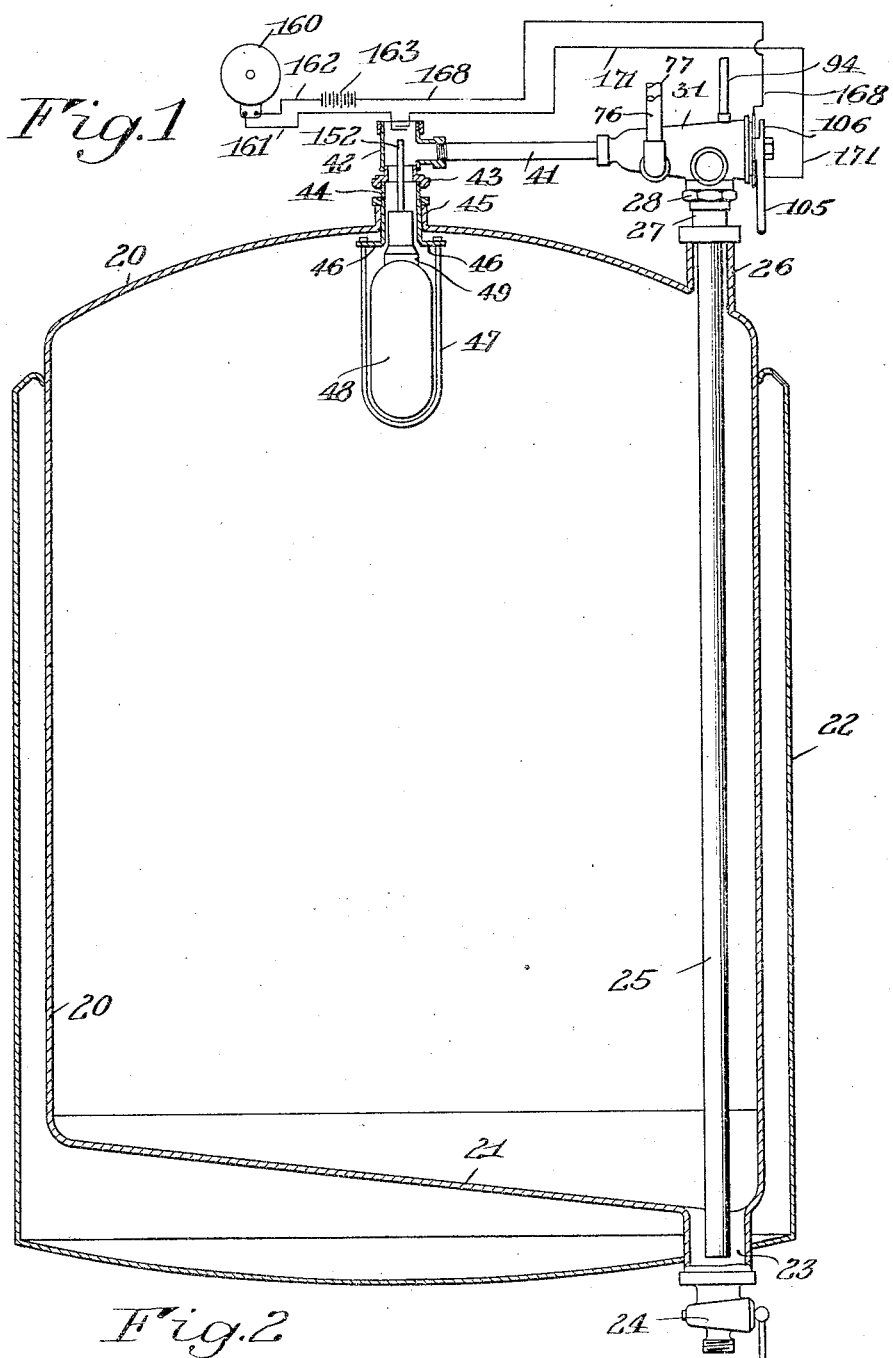
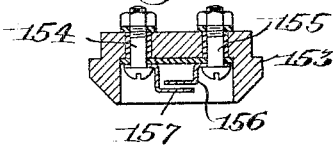

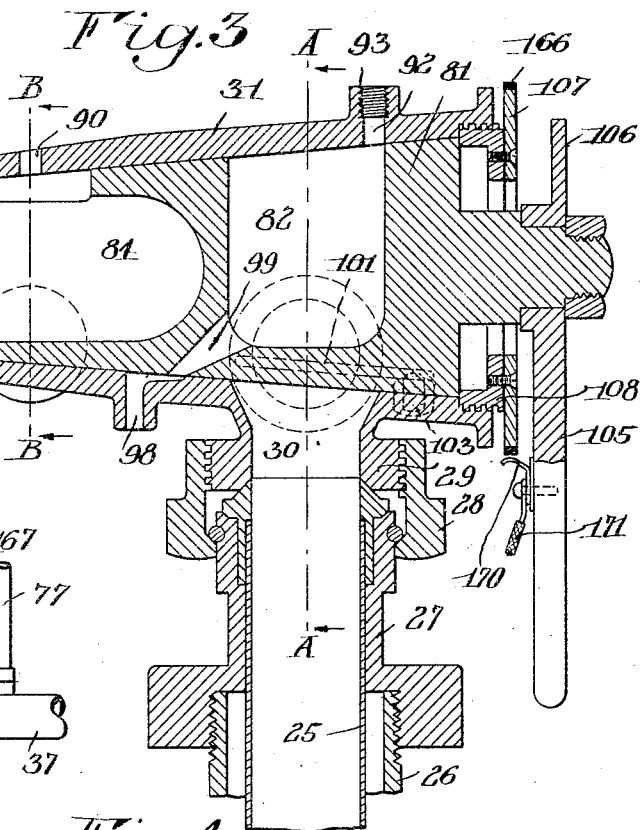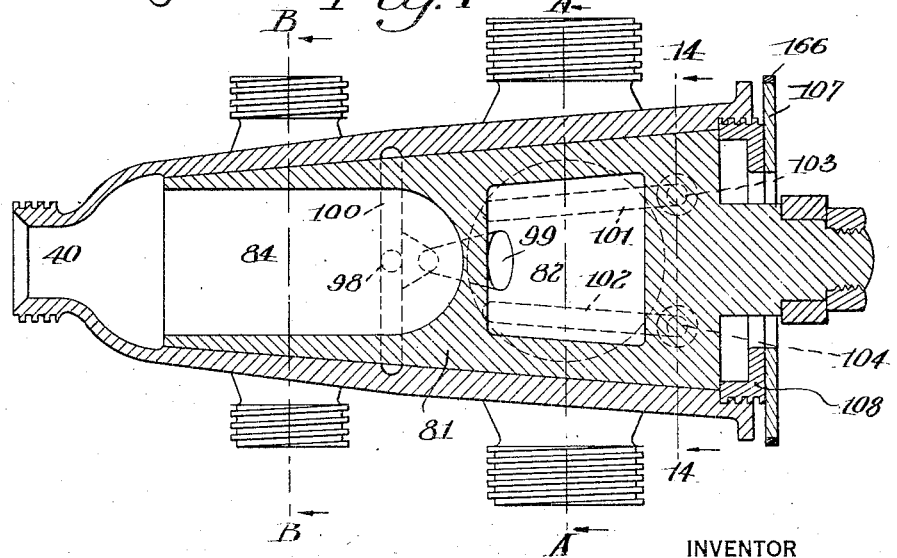

INVENTOR
Jens N. Jacobsen
BY
Cumpston + Griffith
his ATTORNEYS

Jan. 5, 1932.    J. N. JACOBSEN    1,840,100
PROCESSING APPARATUS
Filed Jan. 24, 1929    4 Sheets-Sheet 4

INVENTOR
Jens N. Jacobsen
BY
Cumpston & Griffith
his ATTORNEYS

Patented Jan. 5, 1932

1,840,100

UNITED STATES PATENT OFFICE

JENS N. JACOBSEN, OF ALAMEDA, CALIFORNIA, ASSIGNOR TO THE PFAUDLER CO., OF ROCHESTER, NEW YORK, A CORPORATION OF NEW YORK

PROCESSING APPARATUS

Application filed January 24, 1929. Serial No. 334,842.

This invention relates to a processing apparatus such, for example, as an apparatus for carrying out the pasteurization of milk by the so-called "holding process". The principal object of the invention is to provide a simplified and compact apparatus for carrying out such a process, which apparatus has but few moving parts and is easy to install and to keep in order.

Another object of the invention is the provision of simple apparatus adapted for manual operation, and the provision of novel automatic signalling means for notifying the operator or attendant that certain operations should be performed.

Still another object is the provision, in apparatus of this character, of means for cleaning and/or sterilizing certain parts of the apparatus so that pasteurized milk, for example, will not be contaminated by flowing through a passageway through which raw milk had previously passed.

A further object of the invention is the provision of an improved form of sanitary valve for use in apparatus of this character, which valve is of a simple and unitary construction, easy and comparatively inexpensive to manufacture, and which is provided with means for cleaning and/or sterilizing certain parts thereof.

To these and other ends the invention resides in certain improvements and combinations of parts, all as will be hereinafter more fully described, the novel features being pointed out in the claims at the end of the specification.

In the drawings:

Fig. 1 is a vertical section taken centrally through a pasteurizer holding tank, illustrating features of the invention;

Fig. 2 is a fragmentary vertical section showing the construction of an electrical switch which may be used in connection with the apparatus;

Fig. 3 is a vertical section taken centrally through a control valve constructed in accordance with a preferred embodiment of the invention;

Fig. 4 is a horizontal section through the same;

Fig. 5 is an elevation of one end of the control valve showing the handle and the indicating plate;

Figure 6:
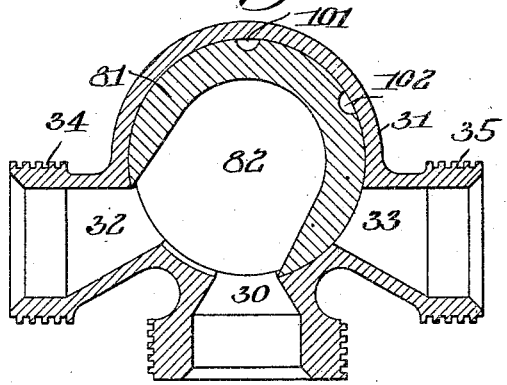
Fig. 6 is a vertical section on the line A—A of Figs. 3 and 4 illustrating the valve plug turned to position to connect the holding tank to a source of fluid supply.
Figure 7:
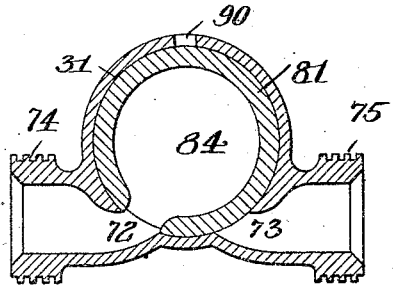
Fig. 7 is a vertical section on the line B—B of Figs. 3 and 4 illustrating the valve plug turned to connect the holding tank to a region of low pressure, to draw liquid into the tank from the source of supply.
Figure 8:
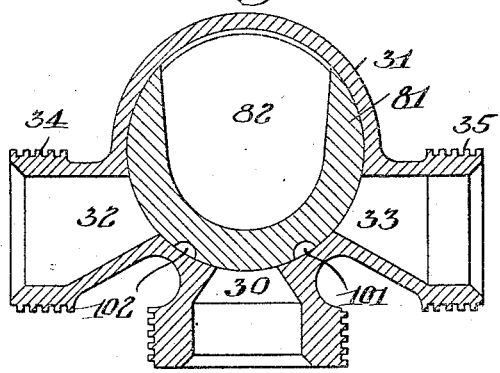
Figure 9:
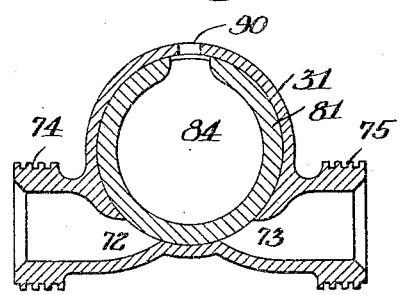
Figure 10:
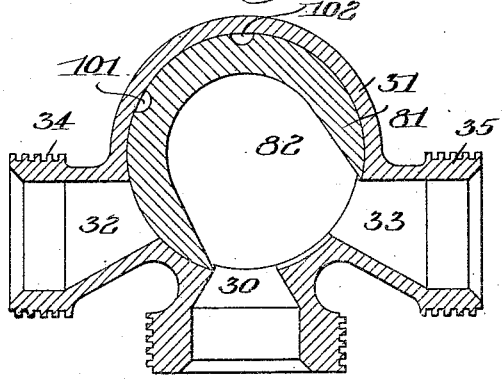
Figure 11:
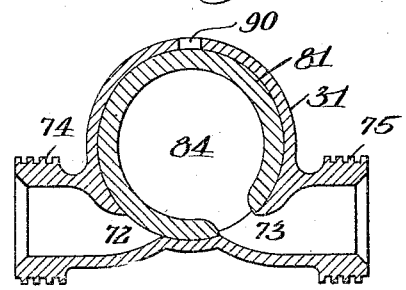
Figure 12:
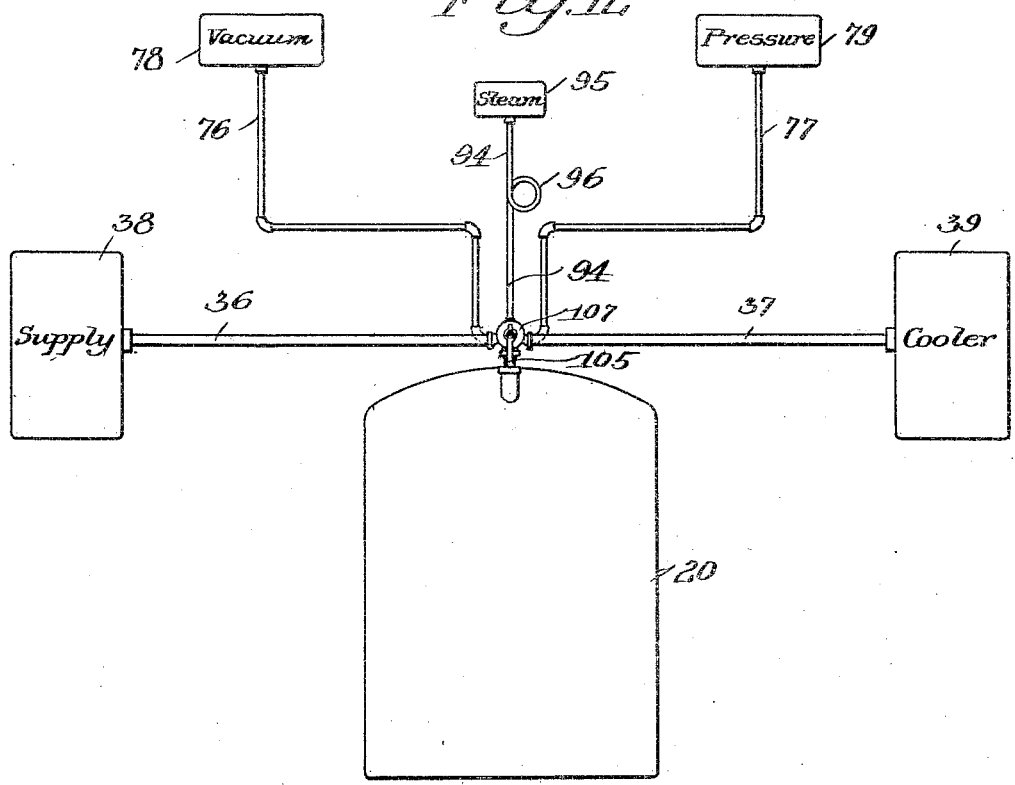
Figure 13:
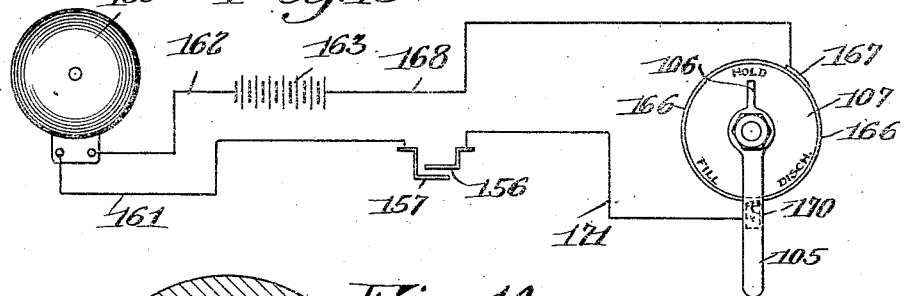

Figs. 8 and 9 are views similar to Figs. 6 and 7 respectively and likewise taken on the lines A—A and B—B respectively of Figs. 3 and 4, illustrating the valve plug in position to disconnect the tank from the source of supply and from the region of low pressure so that the fluid within the tank remains held therein;

Figs. 10 and 11 are similar views illustrating the position of the valve plug when the tank is connected to a fluid discharge point and to a source of pressure so that the fluid within the tank is discharged therefrom;

Fig. 12 is a diagrammatic view of the principal parts of the apparatus;

Fig. 13 is a diagrammatic view of the signalling means, and

Figure 14:
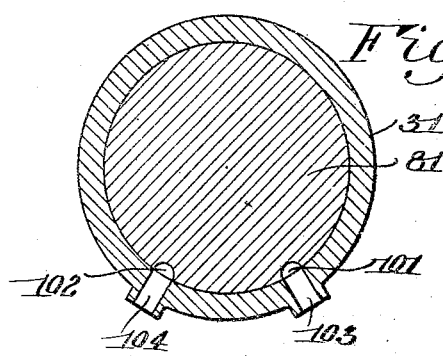

Fig. 14 is a vertical section on the line 14—14 of Fig. 4.

Similar reference numerals throughout the several views indicate the same parts.

The apparatus is described below in connection with a milk pasteurizer holding system although such system is merely illustrative and it will be understood by those skilled in the art that the principles of the invention may be employed equally well in carrying out any other processes.

Referring now to Figs. 1 and 12, there is illustrated a tank or container 20 preferably having a sloping bottom 21 and being provided with a jacket 22 which extends under the bottom and up the sides. For carrying out certain processes, the space between the jacket 22 and the container may be filled with heat insulating material, or for other processes if preferred this jacket may have steam or other heating fluid introduced thereinto to warm the contents of the tank 20 to any desired temperature.

A well 23 is formed at the lowest point of the sloping bottom 21 of the container, and a stop cock 24 provides a means for draining the fluid from this well when desired. Extending down into the well is a conduit 25 which passes upwardly through a neck 26 at the top of the container and is suitably secured to a coupling 27 screw threaded on the top of this neck 26. A nut 28 connects this coupling 27 to a threaded flange 29 (Fig. 3) surrounding a port 30 formed at the bottom of a valve body 31. Other ports 32 and 33 are also formed in the valve body 31 in substantially the same transverse plane as the port 30, as illustrated in Figs. 6, 8 and 10, so that the port 30 may be connected to either of the ports 32 and 33 by suitable movement of the valve plug in the manner described below.

The ports 32 and 33 have threaded flanges 34 and 35 respectively, by means of which they are connected to conduits 36 and 37 respectively, as shown in Fig. 12. The conduit 36 leads from the port 32 to any suitable fluid supply means such as a tank indicated diagrammatically at 38, while the conduit 37 leads from the port 33 to any suitable fluid discharge means which may be, for instance, the cooler indicated diagrammatically at 39.

The smaller end of the tapered valve body 31 has a port 40 formed therein as shown in Figs. 3 and 4, which port is connected by a conduit 41 (Fig. 1) to the side opening of a T fitting 42, the bottom opening of which is secured to a fitting 43 threaded onto the upper end of a sleeve 44 which extends through a neck 45 formed in the top of the container 20. The lower end of this sleeve 44, within the container, has radially extending portions 46 which support a cage 47 which acts as a guide for a float 48. On the top of this float is fixed a valve 49 so arranged that when the float 48 is elevated, the valve 49 closes the open lower end of the sleeve 44 and thus cuts off communication between the interior of the container 20 and the conduit 41 which leads to the port 40 of the valve 31.

In addition to the ports 30, 32, 33 and 40, the valve body 31 is also provided with ports 72 and 73 arranged in a different plane from the ports 30, 32 and 33 and preferably in a plane between these ports and the port 40 at the end of the valve body 31. Threaded flanges 74 and 75 associated with the ports 72 and 73 respectively provide means for connecting these ports to conduits 76 and 77 respectively. The conduit 76 connects the port 72 to a region of pressure lower than the pressure upon the supply 38, this region being indicated diagrammatically at 78. It may comprise, for example, a suitable tank and a vacuum pump for evacuating the tank. The conduit 77 connects the port 73 with a source of pressure greater than the pressure upon the discharge point 39, this source of pressure being indicated diagrammatically at 79. It may comprise, for example, an air compressor and a tank for storing compressed air.

Rotatably mounted within the valve body 31 is a valve plug indicated generally by the numeral 81 which plug has two separate passageways formed therein. One of these passageways, designated as 82 in Figs. 3, 4, 6, 8 and 10, is in the transverse plane of the ports 30, 32 and 33. When the plug 81 is turned to one position, the passageway 82 is disconnected from all three of these ports, as shown in Fig. 8. When the valve plug is turned to another position, the passageway 82 establishes communication between the port 30 and the port 32, as illustrated in Fig. 6, while when the plug is turned to another position the passageway establishes communication between the port 30 and the port 33, as shown in Fig. 10.

The other passageway in the plug 81 is indicated by the numeral 84. This passageway has an opening concentric with the axis of the valve plug at the small end thereof, so that it is always in communication with the port 40 in all positions to which the plug may be rotated, as shown in Figs. 3 and 4. A lateral opening in this passageway 84 is arranged in the transverse plane of the ports 72 and 73, so that it may be brought into registration with the port 72, as shown in Fig. 7, or with the port 73, as shown in Fig. 11, or may be shifted to a position in which it is disconnected from both of the ports 72 and 73, as illustrated in Fig. 9. The position of the two passageways 82 and 84 relative to each other is so arranged that when the former is in the position shown in Fig. 6, the latter is in that illustrated in Fig. 7. When the plug 81 is turned to bring the passageway 82 to the position shown in Fig. 8, the other passageway 84 is brought to the position illustrated in Fig. 9. Likewise, when the plug is shifted to place the passageway 82 in the position illustrated in Fig. 10, the other passageway 84 is placed in the position shown in Fig. 11.

In addition to the main ports above mentioned, various supplementary ports may be provided. For instance, the port 90, extending through the top of the valve body 31 in the plane of the ports 72 and 73, is arranged to communicate with the passageway 84 when the valve plug 81 is turned to the position illustrated in Figs. 3 and 9. This port 90 is open to the atmosphere and constitutes a venting port for equalizing the pressure within the container 20 with atmospheric pressure after the container has been connected to the region of low pressure 78 or the source of pressure 79.

In addition to the supplementary port 90 cooperating with the passageway 84, there may be one or more supplementary ports cooperating with the other passageway 82 of the valve plug. For instance, a port 92, shown in Fig. 3, may extend through the top of the valve body 31 and may have a threaded flange 93 surrounding it. This port is connected to any suitable source of cleaning and/or sterilizing fluid. For example, a conduit 94 shown in Fig. 12 may extend from the threaded flange 93 to a source of steam indicated diagrammatically at 95. When the valve plug 81 is turned to the position shown in Figs. 3 and 8, the port 92 is in communication with the passageway 82 and the steam or other fluid enters the passageway to clean and sterilize it. Preferably, a coil 96 (Fig. 12) is provided in the conduit 94 so that some steam will condense therein during the time that the port 92 is not in communication with the passageway 82. When the passageway is brought into communication with the port, the steam pressure will first force the condensate which has collected in the coil 96 through the port 92 and into the passageway 82, thus washing and cleaning the walls thereof. When all of the condensate from the coil has flowed into the valve, a flow of steam will follow, which will further clean and sterilize the passageway 82.

The cleaning fluid thus introduced into the passageway 82 through the port 92 may be drained from the passageway by a venting port 98 (Figs. 3 and 4) which is arranged to cooperate with an extension 99 of the passageway 82. This port 98 is open to the atmosphere, and since the extension 99 is at substantially the lowest point of the passageway 82, any fluid within this passageway may drain out easily when the valve plug is turned to the position shown in Figs. 3, 4 and 8.

From the foregoing description it will be seen that the ports in the valve body 31 may be said to be divided into two groups. One group comprises the ports 30, 32, 33, 92 and 98, which are arranged to cooperate with the passageway 82. The other group comprises the ports 40, 72, 73, and 90, which are arranged to cooperate with the passageway 84. It is desirable to prevent any possibility of leakage of fluid from the ports of one group to the ports of the other, and for this reason a leakage groove 100 (Fig. 4) may be provided, extending circumferentially around the inner wall of the valve body 31 and communicating with the venting port 98 so that any fluid tending to leak between the valve plug 81 and the valve body 31, from one group of ports to the other, will be caught by this leakage groove and drained out of the valve through the port 98.

It is also desirable to prevent leakage from either of the ports 32 and 33 into the port 30. For this reason, leakage grooves 101 and 102 (Figs. 3, 4 and 14) are provided in the valve plug 81, extending longitudinally along the outer surface thereof in such position that when the plug is turned to the position shown in Figs. 8 and 14, the groove 101 will lie between the port 33 and the port 30 while the groove 102 will lie between the port 32 and the port 30. Any fluid tending to leak between these ports will be caught by these leakage grooves and drained out through openings 103 and 104 formed through the valve casing 31 in a position to communicate with the lower ends of the grooves 101 and 102 when the valve plug is turned to the position illustrated in Figs. 3, 4, 8, and 14.

A handle 105 is provided on the end of the valve plug so that the plug may be operated manually, and an extension 106 on this handle forms a pointer for cooperating with suitable markings on an indicating plate 107 held stationary on the nut 108 which holds the plug 81 in the valve body 31. This plate 107 is illustrated in Figs. 3, 4, 5, and 13. As shown in Fig. 5, the pointer 106 points to the word "Hold" when the handle 105 is turned downwardly, the passageways 82 and 84 then being in the positions shown in Figs. 8 and 9. If the handle be turned to bring the pointer 106 opposite the word "Fill," the passageways in the valve will be moved to the position shown in Figs. 6 and 7. If the valve plug is turned to bring the pointer 106 opposite the abbreviation "Disch.," meaning "discharge," the passageways will be shifted to the position illustrated in Figs. 10 and 11.

Suitable indicating mechanism is preferably employed for notifying the operator of the apparatus that a predetermined quantity of fluid is within the container 20, so that he will know that it is time to shift the valve 31 from the "Fill" position to the "Hold" position. This mechanism may take the form of signalling means under the control of or responsive to the float valve 49. In the present instance, a member 152 extending upwardly from the float valve is arranged to close an electrical switch or contact when the float valve is elevated. The electrical contact is shown diagrammatically in Figs. 1 and 13, and its detailed construction is illustrated in Fig. 2, from which it is seen that a cap 153 which extends across and closes the upper end of the T fitting 42 is provided with two bolts 154 and 155 extending therethrough, each bolt being insulated from the cap. An electrical conducting member 156 is secured to the lower end of the bolt 155, while the bolt 154 has attached thereto a resilient leaf 157 of conducting material normally spaced slightly from the member 156. It is obvious that as the float 48 rises, the member 152 will come into contact with the resilient leaf 157 and press it upwardly against the member 156, thus closing the switch or contact. If the members 157 and 156 are connected to any suitable electrical signalling means, the float 48 may thus be used to operate the signalling means.

A preferred form of signalling means is indicated diagrammatically in Figs. 1 and 13. As will be seen from these views, an electric bell 160 is provided, and a conductor 161 connects one of the binding posts on this bell to the switch member 157. A conductor 162 leads from the other binding post on the bell to one pole of the battery 163, and if the other pole of the battery be connected to the other switch member 156, it is obvious that the signal bell 160 will ring whenever the float valve 49 rises sufficiently to close the switch 156, 157.

It is desirable to connect the battery 163 to the switch member 156 in such a way that the circuit may be broken, so that the bell 160 will not ring unnecessarily continuously during the entire time that the float 48 remains elevated. Since the signal is needed only to notify the operator that the manually controlled valve 31 should be shifted, means under the control of this valve may be provided for breaking the signal circuit so that the operation of the signal will be discontinued when the valve has been shifted.

This interconnection between the valve 31 and the signal circuit may be made in the manner illustrated in Figs. 1 and 13. A ring 166 of insulating material extends around the periphery of the indicating disk 107 associated with the valve, and at one point on this insulating ring is an electrical contact 167 (Fig. 13) connected by a conductor 168 to the battery 163. The handle 105 which is secured to the valve plug 81 and which serves to turn this plug to the various positions, carries an electrical contact 170 connected by a conductor 171 to the switch member 156. The contact 167 is so placed that the contact 170 on the handle will contact therewith when the valve is in the filling position, during which fluid is being drawn into the container 20. When in this position, the electric signalling circuit is closed except for the switch 156, 157, and the upward movement of the float 48 when a predetermined quantity of fluid has entered the container will close this switch 156, 157 and operate the signal bell.

Upon hearing this signal, the operator knows that the container is sufficiently filled with fluid, and he then shifts the handle 105 of the valve 31 away from the filling position to any other position desired, preferably to the holding position. When the handle 105 is shifted from filling position, the contacts 167 and 170 are separated, and thus the signal circuit is broken so that the signalling means is rendered inoperative and the bell does not continue to ring unnecessarily while the fluid is being held within the container 20.

In operation, when it is desired to fill the container 20 with fluid to be processed from the supply means 38, the valve handle is moved to the "Fill" position. This causes the passageway 82 to establish communication between the port 32 connected to the supply means 38 and the port 30 connected to the container 20, and also brings the electrical contacts 167 and 170 together. At the same time, the passageway 84 of the valve establishes communication between the port 72, connected to the region of low pressure 78, and the port 40 which is connected to the container 20. The pressure within the container 20 being thus reduced below the pressure on the supply means 38, the fluid from the latter is drawn into the former. When the fluid reaches a predetermined level within the container, the float 48 will be elevated to close the float valve 49 and concomitantly to close the electrical switch 156, 157 to ring the bell 160, thus notifying the operator that a predetermined quantity of fluid is within the container 20 and that the valve should be shifted to the "Hold" position. Should the operator fail to move the valve immediately, however, no great harm will be done, because the float valve 49 has closed the connection between the container 20 and the region of low pressure 78, so that the flow of fluid into the container is substantially stopped.

When the operator hears the signal bell 160 begin to ring, or as soon thereafter as possible, he shifts the valve handle 105 to the "Hold" position. This separates the contacts 167 and 170, stopping the ringing of the bell, and moves the passageways 82 and 84 to the position illustrated in Figs. 3, 4, 8, and 9, cutting off communication between the port 30 and the port 32, and between the port 40 and the port 72. At this time, the passageway 84 establishes communication between the port 40 and the atmosphere, through the venting port 90, so that the low pressure or partial vacuum within the container 20 may be relieved by flow of air into the container, thus returning the interior of the container substantially to atmospheric pressure. During this time also the passageway 82 is brought into communication with the ports 92 and 98, so that the condensate from the coil 96 and steam from the source 95 flow into the passageway through the former port and out through the latter. This cleans the passageway of the untreated fluid which has passed therethrough on its way from the supply means 38 to the container 20 and prepares it for the subsequent flow therethrough of treated fluid from the container 20 to the discharge means 39, so that the treated fluid will not be contaminated by any residue of untreated fluid. This is especially important where the untreated and treated fluids are, respectively, raw and pasteurized milk.

At the end of the predetermined holding time, which may be of any desired length, the valve handle 105 is shifted to the "Discharge" position. When in this position, the passageway 82, as shown in Fig. 10, establishes communication between the port 30 connected to the container 20 and the port 33 connected to the discharge means 39. At the same time, as illustrated in Fig. 11, the passageway 84 establishes communication between the port 40 connected to the container 20 and the port 73 connected to the source of pressure 79. The pressure from this source, thus entering the container 20, drives the fluid therefrom up the conduit 25, through the valve, and along the conduit 37, to the discharge means 39, which discharge means may comprise any suitable receptacle such as a milk cooler if the process being carried out is the pasteurization of milk.

It will be noted that the only portions of the apparatus through which fluid flows during both the filling and discharging operations are the passageway 82 and the conduit 25. As to the former, this is cleaned and sterilized subsequent to each filling operation and preparatory to the discharge operation, so that the treated fluid is not contaminated; and as to the conduit 25, since practically all of this is within the container 20 the fluid within this conduit will undergo the same treatment as the fluid within the rest of the container 20, so that there is no danger of contamination from this source.

It will be seen that the apparatus provided is of simple character, very compact, easily operated, and not liable to get out of order. It may be installed easily and comparatively quickly and the apparatus may be adapted to practically any irregular space which is available for it, since the various elements 38, 39, 78, 79, and 95 need not be placed in any special position with respect to the container 20.

While one embodiment of the invention has been disclosed, it is to be understood that the inventive idea may be carried out in a number of ways. This application is therefore not to be limited to the precise details shown, but is intended to cover all variations and modifications thereof falling within the spirit of the invention or the scope of the appended claims.

I claim as my invention:

1. A valve comprising a body having two groups of ports, each group including a fluid inlet, a fluid outlet, and a port open to the atmosphere, a valve plug having two passageways disconnected from each other, each passageway being arranged to connect a port of one group to a selected port of the same group, and means for introducing a cleaning fluid into one of said passageways only when the latter is connected to the port open to the atmosphere and is disconnected from said fluid inlet port and said fluid outlet port.

2. A valve comprising a body having two groups of ports, one group having a fluid inlet and a fluid outlet, one port of each group being open to the atmosphere, a valve plug having two passageways disconnected from each other, said passageways and ports being so related that when one of said passageways connects one port of one group to another port of the same group, the other of said passageways will connected one port of the second group to another port of the second group, and so that when one passageway is connected to one port open to the atmosphere the other passageway will be connected to the other port open to the atmosphere, and means for introducing a cleaning fluid into one of said passageways when said passageway is in communication with the atmosphere and disconnected from said fluid inlet and outlet.

3. A processing apparatus comprising a fluid container, fluid supply means, a region of pressure less than the pressure on said fluid supply means, conduit means connecting said container to said supply means, means including a valve for connecting said container to said region of pressure to tend to draw fluid from said supply means into said container, and automatic means responsive to the quantity of fluid within the container for concomitantly indicating the presence of a predetermined quantity of fluid within the container and for disconnecting said container from said region of pressure.

4. A processing apparatus comprising a fluid container, fluid supply means, a region of pressure less than the pressure on said fluid supply means, conduit means connecting said container to said supply means, means including a valve for connecting said container to said region of pressure to tend to draw fluid from said supply means into said container, and alarm mechanism for indicating the presence of a predetermined quantity of fluid within said container to notify the operator that said valve should be closed, said alarm mechanism including a float valve for disconnecting said container from said region of pressure.

5. A processing apparatus comprising a fluid container, fluid supply means, a region of pressure less than the pressure on said fluid supply means, conduit means connecting said container to said supply means, means including a valve for connecting said container to said region of pressure to tend to draw fluid from said supply means into said container, signal means including an electric circuit, and a single means responsive to the quantity of fluid within said container for disconnecting said container from said region of pressure and for closing said electric circuit to operate said signal means to indicate that said valve should be closed.

6. A processing apparatus comprising a fluid container, fluid supply means, a region of pressure less than the pressure on said fluid supply means, conduit means connecting said container to said supply means, means including a manually operable valve and a float valve for connecting said container to said region of pressure to tend to draw fluid from said supply means into said container, said float valve being arranged to close when the fluid within said container reaches a predetermined level, and signal means under the control of said float valve for notifying the operator that said manually operable valve should be closed.

7. A processing apparatus comprising a fluid container, mechanism for introducing fluid into said container, automatic means including an electric switch responsive to the quantity of fluid within the container for indicating the pressure of a predetermined quantity of fluid within the container, and means including a second electric switch under the control of said mechanism for controlling said indicating means.

8. A processing apparatus comprising a fluid container, fluid supply means, a region of pressure less than the pressure on said fluid supply means, conduit means connecting said container to said supply means, means including a valve for connecting said container to said region of pressure to tend to draw fluid from said supply means into said container, mechanism for concomitantly disconnecting said container from said region and for indicating the presence of a predetermined quantity of fluid within said container to indicate that said valve should be shifted, and means under the control of said valve for controlling said indicating mechanism.

9. A processing apparatus comprising a fluid container, fluid supply means, a region of pressure less than the pressure on said fluid supply means, conduit means connecting said container to said supply means, means including a valve for connecting said container to said region of pressure to tend to draw fluid from said supply means into said container, signal means including an electric circuit, means independent of said valve and responsive to the quantity of fluid within said container for disconnecting said container from said region and for closing said electric circuit to operate said signal means to indicate that said valve should be shifted, and means controlled by the shifting of said valve to open said electric circuit to render said signal means inoperative.

10. A processing apparatus comprising a fluid container, fluid supply means, a region of pressure less than the pressure on said fluid supply means, conduit means connecting said container to said supply means, means including a manually operable valve and a float valve for connecting said container to said region of pressure to tend to draw fluid from said supply means into said container, said float valve being arranged to close when the fluid within said container reaches a predetermined level, signal means set into operation by movement of said float valve for indicating that said manually operable valve should be closed, and mechanism operable by the closing of said manually operable valve for rendering said signal means inoperative.

11. A processing apparatus comprising a fluid container, fluid supply means, a region of pressure less than the pressure on said fluid supply means, a valve body having a plurality of ports therein, conduit means connecting said supply means to one of said ports, conduit means connecting said region of pressure to another of said ports, conduit means connecting said container to two other ports in said valve body, and a valve plug movable within said body and having two passageways, said plug being shiftable from a position in which said ports are disconnected from each other to a position in which one of said passageways establishes communication between the port connected to said supply means and one of the ports connected to said container while the other passageway establishes communication between the port connected to said region of pressure and the other port connected to said container to tend to draw fluid from said supply means into said container.

12. A processing apparatus comprising a fluid container, fluid discharge means, a source of pressure greater than the pressure on said discharge means, a valve body having a plurality of ports therein, conduit means connecting said source of pressure to one of said ports, conduit means connecting another of said ports to said discharge means, conduit means connecting said container to two other ports in said valve body, and a valve plug movable within said body and having two passageways, said plug being shiftable from a position in which said ports are disconnected from each other to a position in which one of the passageways establishes communication between one of the ports connected to the container and the port connected to the discharge means, while the other of said passageways establishes communication between the other port connected to the container and the port connected to said source of pressure, to tend to drive the fluid from the container toward said discharge means.

13. A processing apparatus comprising a fluid container, fluid discharge means, a source of pressure greater than the pressure on said discharge means, a valve body having a plurality of ports therein, conduit means connecting said source of pressure to one of said ports, conduit means connecting another of said ports to said discharge means, conduit means connecting said container to two other ports in said valve body, a valve plug movable within said body and having two passageways, said plug being shiftable from a position in which said ports are disconnected from each other to a position in which one of the passageways establishes communication between one of the ports connected to the container and the port connected to the discharge means, while the other of said passageways establishes communication between the other port connected to the container and the port connected to said source of pressure, to tend to drive the fluid from the container toward said discharge means, and means for introducing a cleaning fluid into said first passageway to clean the same preparatory to shifting said valve plug to establish communication between said container and said discharge means.

14. A processing apparatus comprising a fluid container, fluid supply means, a region of pressure less than the pressure on said fluid supply means, a valve body having a plurality of ports therein, conduit means connecting said supply means to one of said ports, conduit means connecting said region of pressure to another of said ports, conduit means connecting said container to two other ports in said valve body, a valve plug movable within said valve body and having two passageways, said plug being shiftable from a position in which said ports are disconnected from each other to a position in which one of said passageways establishes communication between the port connected to said supply means and one of the ports connected to said container, while the other passageway establishes communication between the other port connected to said container and the region of pressure, to tend to draw fluid from said supply means into said container, and means for introducing a cleaning fluid into said first passageway to clean the same subsequent to the passage of fluid therethrough from said supply means to said container.

15. A processing apparatus comprising a fluid container, fluid supply means, a region of pressure less than the pressure on said fluid supply means, fluid discharge means, a source of pressure greater than the pressure on said fluid discharge means, a valve body having a plurality of ports therein, conduit means connecting said supply means to one of said ports, conduit means connecting said discharge means to another of said ports, conduit means connecting said region of pressure to another of said ports, conduit means connecting said source of pressure to another of said ports, conduit means connecting said container to two other ports in said valve body, and a valve plug movable within said body and having two passageways, said plug being shiftable from a position in which said ports are disconnected from each other to a position in which one of the passageways establishes communication between one of the ports connected to the container and the port connected to said supply means while the other passageway establishes communication between the other port connected to said container and the port connected to said region of pressure, to tend to draw fluid into said container from said supply means, said valve plug being shiftable also to a position in which one of said passageways establishes communication between one of the ports connected to the container and the port connected to the discharge means while the other of said passageways establishes communication between the other port connected to the container and the port connected to said source of pressure, to tend to discharge the fluid from said container toward said discharge means.

16. A processing apparatus comprising a fluid container, fluid supply means, a region of pressure less than the pressure on said fluid supply means, fluid discharge means, a source of pressure greater than the pressure on said discharge means, conduit means for connecting said container with said supply means, said region of pressure, said discharge means, and said source of pressure, and valve means for controlling said conduit means, said valve means being shiftable selectively from a position in which said container is operatively disconnected from said supply means, region of pressure, discharge means, and source of pressure, to a position to establish communication between said container and said supply means and between said container and said region of pressure, to tend to draw fluid into said container from said supply means, and being shiftable also to a position to establish communication between said container and said discharge means and between said container and said source of pressure, to tend to discharge the fluid from said container toward said discharge means.

17. A processing apparatus comprising a fluid container, fluid supply means, a region of pressure less than the pressure on said fluid supply means, fluid discharge means, a source of pressure greater than the pressure on said discharge means, conduit means for connecting said container with said supply means, said region of pressure, said discharge means, and said source of pressure, valve means for controlling said conduit means, said valve means being shiftable selectively from a position in which said container is operatively disconnected from said supply means, region of pressure, discharge means, and source of pressure, to a position to establish communication between said container and said supply means and between said container and said region of pressure, to tend to draw fluid into said container from said supply means, and being shiftable also to a position to establish communication between said container and said discharge means and between said container and said source of pressure, to tend to discharge the fluid from said container toward said discharge means, and means for introducing cleaning fluid into said valve means to clean a portion thereof preparatory to shifting the valve means to discharge fluid from the container.

18. A processing apparatus comprising a fluid container, fluid supply means, fluid discharge means, a valve body having a plurality of ports therein, conduit means connecting said supply means to one of said ports, conduit means connecting said discharge means to another of said ports, conduit means connecting said container to another of said ports, a valve plug movable within said body and having a passageway, said plug being shiftable from a position in which said ports are disconnected from each other to a position in which the passageway establishes communication between the port connected to the container and the port connected to said supply means, and also shiftable to another position in which the passageway establishes communication between the port connected to the container and the port connected to said discharge means, and means for venting said passageway to drain fluid therefrom when said passageway is operatively disconnected from both said supply means and said discharge means.

19. A processing apparatus comprising a fluid container, fluid supply means, fluid discharge means, a valve body having a plurality of ports therein, conduit means connecting said supply means to one of said ports, conduit means connecting said discharge means to another of said ports, conduit means connecting said container to another of said ports, a valve plug movable within said body and having a passageway, said plug being shiftable from a position in which said ports are disconnected from each other to a position in which the passageway establishes communication between the port connected to the container and the port connected to said supply means, and also shiftable to another position in which the passageway establishes communication between the port connected to the container and the port connected to said discharge means, means for venting said passageway to drain fluid therefrom when said passageway is operatively disconnected from both said supply means and said discharge means, and means for introducing cleaning fluid into said passageway.

20. A processing apparatus comprising a fluid container, fluid discharge means, a source of pressure greater than the pressure on said discharge means, conduit means connecting said container to said discharge means and to said source of pressure, and valve means for controlling said conduit means, said valve means being shiftable selectively from a position in which said container is operatively disconnected from said discharge means and source of pressure to a position to establish communication between said container and said discharge means and between said container and said source of pressure, to tend to discharge the fluid from said container toward said discharge means.

JENS N. JACOBSEN.